United States Patent [19]

Smith

[11] Patent Number: 5,702,111
[45] Date of Patent: Dec. 30, 1997

[54] SEALING APPARATUS

[76] Inventor: Henry Roy Smith, Thorney, Darbys Green, Knightwick, Worcester, England

[21] Appl. No.: 630,207

[22] Filed: Apr. 10, 1996

Related U.S. Application Data

[63] Continuation of Ser. No. 368,962, Jan. 5, 1995, abandoned.

[51] Int. Cl.$^6$ ............................................. F16J 15/12
[52] U.S. Cl. ............................ 277/228; 277/235 A
[58] Field of Search .......................... 277/1, 227, 228, 277/229, 235 R, 235 A, 235 B, DIG. 6

[56] References Cited

U.S. PATENT DOCUMENTS

| | | | |
|---|---|---|---|
| 2,796,457 | 6/1957 | Stinger | 277/235 R |
| 2,992,151 | 7/1961 | Niessen | 277/235 B |
| 3,575,427 | 4/1971 | Lapac et al. | 277/215 |
| 3,914,490 | 10/1975 | Fusiek | 277/235 R |
| 4,013,810 | 3/1977 | Long | 428/308 |
| 4,180,211 | 12/1979 | Olcott et al. | 277/227 |
| 4,271,228 | 6/1981 | Foster et al. | 277/235 B |
| 4,485,192 | 11/1984 | Gibbs et al. | 521/54 |
| 4,580,790 | 4/1986 | Doose | 277/228 |
| 4,580,794 | 4/1986 | Gibbons | 277/228 |
| 4,911,972 | 3/1990 | Mercuri | 277/235 R |
| 5,262,454 | 11/1993 | Leroux et al. | 523/219 |

FOREIGN PATENT DOCUMENTS

| | | |
|---|---|---|
| 1351597 | 5/1974 | United Kingdom . |
| 1443927 | 3/1976 | United Kingdom . |
| 2084600 | 6/1982 | United Kingdom . |

*Primary Examiner*—William A. Cuchlinski, Jr.
*Assistant Examiner*—John L. Beres
*Attorney, Agent, or Firm*—Gary M. Nath; Nath & Associates

[57] ABSTRACT

A sealant comprises a matrix of flexible (preferably, elastomeric polymer or copolymer) material embedded in which are frangible elements inert to the matrix material. The matrix material is selected from the group comprising acrylonitrile copolymers, polyvinyl alcohols, polyurethanes, silicones and acrylonitrile-butiedene-styrene terpolymer. The frangible elements may be hollow bodies—glass spheres—with a diameter of between 20 and 200 microns (advantageously, substantially equal to 75 microns) and a density in the range 0.1 to 2.4 g/cc (advantageously, substantially equal to 0.12 g/cc). A described sealant comprises 15 parts w/w of a solvent free acrylic matrix material to which is added two parts w/w of hollow glass spheres. In addition to the frangible elements, particles of other materials having relatively high thermal conductivity may be included in the matrix material. A gasket sealing arrangement provides the sealant as a coating for an electrically conductive gasket in the form of an aluminium sheet with protrusions extending away from each major surface thereof, the arrangement being that on application of pressure the protrusions extend through the matrix material to electrically contact the surfaces between which the arrangement is placed. A method of locating a conductive sealing gasket of the noted form using the noted sealants between an antenna base and an airframe is described.

15 Claims, 2 Drawing Sheets

SEALING APPARATUS

This application is a Continuation of U.S. patent application Ser. No. 08/368,962, filed Jan. 5, 1995.

BACKGROUND OF THE INVENTION

The invention relates to methods, means and apparatus for providing effective sealing between mating surfaces.

The provision of a sealant between two surfaces, for example to prevent ingress of water, air and the like is a problem which has faced many industries for a considerable time. Many different types of sealant have been proposed which will readily perform this function and as a generality different ways of providing a seal between two fixed and immovable surfaces are well known.

Difficulties arise in the circumstances in which a seal is required between two surfaces one of which is subject to movement and/or vibration in use—for example between the base of an antenna and a airframe to which the antenna is attached. Difficulties are also encountered if the sealant is to be used to seal a gap between two surfaces which are not of the same precise configuration—again one can consider the generally flat base of an antenna for mounting on an aircraft frame which may, itself, be curved or bowed.

Further difficulties arise when the sealant is to be used with a gasket mountable between two surfaces to be fixed together. Again, in the aircraft industry conductive sealing gaskets are required to be positioned between the bases of antennas and airframes on which they are to be mounted. At present this problem can be overcome by making use of a conductive sealing gasket such as described in UK Patent 1 351 597 together with a two part, wet, sealant material.

A conductive sealing gasket of UK Patent Specification 1 351 597 is a conductive gasket in the form of a metal (e.g. aluminium) sheet having protrusions extending away from each major surface thereof, the arrangement being such that upon application of pressure to the gasket the protrusions bear against and provide good electrical contact between surfaces between which the gasket is placed. The protrusions are preferably formed as upstanding teeth which are cut or punched from a sheet of aluminium material and it will be seen that the teeth are driven to collapse as pressure is applied to them—that pressure causing the teeth to wipe across the surfaces against which they bear cleaning the surfaces and aiding the electrical contact of the gasket material with those surfaces.

The method of effecting sealing with this arrangement is for an operative to coat the gasket with a two part sealant (for example that sold by H R Smith (Technical Developments) Ltd of Street Court, Kingsland, Leominster, Herefordshire under the designation HRS10-500-11-AB) prior to mounting it on the base of the antenna (or the airframe) before the antenna is positioned on the airframe.

In such an arrangement the upstanding protrusions of the sealing gasket extend through the wet sealant which is placed thereon as the antenna is positioned on the airframe and bolted to it.

Such arrangements give rise to difficulties in use—in particular, an operative mounting the antenna must be skilled in correctly preparing the sealant and placing it on the gasket to ensure the gasket is adequately covered prior to mounting the antenna on the airframe.

Objects of the invention include the provision of methods, means and apparatus for ensuring adequate sealing between cooperating surfaces—and in particular the adequate sealing of antennas mounting on airframes.

SUMMARY OF THE INVENTION

In a first aspect the invention provides a sealant comprising in combination a matrix of flexible material having embedded therein a plurality of frangible elements which elements are inert to the matrix material.

The said flexible matrix material may comprise any suitable elastomeric polymer or copolymer, and is preferably selected from the group comprising acrylonitrile copolymers, polyvinyl alcohols, polyurethanes, silicones, acrylonitrile-butiedene-styrene terpolymer, and rubber.

The frangible elements are preferably hollow bodies, desirably hollow glass spheres.

The said hollow glass spheres advantageously have a diameter of between 20 and 200 microns and a density in a range of 0.1 to 2.4 g/cc, with particular advantage the glass spheres have a diameter substantially equal to 75 microns and a density substantially equal to 0.12 g/cc.

A sealant embodying the invention preferably comprises 15 parts by weight of a solvent free acrylic matrix material admixed with two parts by weight of hollow glass spheres with a diameter substantially equal to 75 microns and a density substantially equal to 0.12 g/cc.

An alternative sealant embodying the invention comprises 10 parts w/w of rubber with 1 part w/w of glass spheres with a diameter substantially equal to 75 microns and a density substantially equal to 0.12 g/cc.

In addition to the noted frangible elements, particles of other materials having a relatively high thermal and/or electrical conductivity may be included.

A second aspect of the invention provides a sealant as defined above, provided as a coating for a conductive gasket in the form of a metal sheet having protrusions extending away from each major surface thereof, the arrangement providing that upon the application of pressure thereto the protrusions on the gasket extend through the sealant matrix material to provide electrical contact between surfaces between which the gasket sealing arrangement is placed.

The gasket sealing arrangement may provide that said protrusions are formed as upstanding teeth cut or punched from a sheet of metal material, which teeth are driven to collapse as pressure is applied to them, the arrangement providing further that the frangible elements in the matrix material are locally crushed as pressure is applied to the arrangement.

The gasket sealing arrangement may be provided such that the protrusions are formed as teeth extending at an angle to the normal way from the surfaces of the metal and that matrix material is provided to cover the material of said sheet and said protrusions.

Alternatively the protrusions may be formed as hollow members extending normally from the surface of a metal sheet from which they are punched, and the upper edges of said members are coterminous with the sealant matrix material applied to the arrangement.

The metal sheet may be of aluminium, nickel or other materials selected for its compatibility with the materials of devices between which it is to be interposed.

Another aspect of the invention provides a method of locating a conductive sealing gasket in the form of a metal sheet having protrusions extending away from each major surface thereof between two surfaces, the method comprising the steps of coating the gasket with a flexible sealant as claimed in any one of claims 1 to 9, locating the sealant coated gasket between the two surfaces to be joined and then fixing the two surfaces together such that the conductive sealing gasket electrically contacts each of the two surfaces whilst the sealant coating thereon provides a seal preventing ingress of moisture, air or other fluids.

The above and other aspects, features and advantages of the invention will become apparent from the following description of examples thereof now made with reference to the accompanying drawings in which:

DETAILED DESCRIPTION OF THE DRAWINGS

Figure 1:
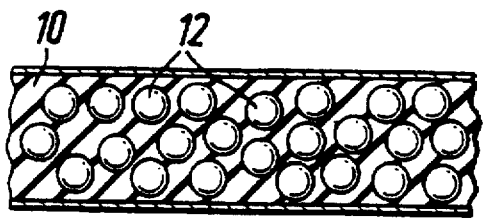
FIG. 1 illustrates in cross-section and to an enlarged scale a sealant embodying the invention.
Figure 2:
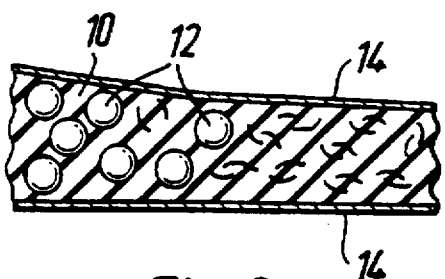
FIG. 2 illustrates the sealant of FIG. in an operative position between two surfaces.

Referring to FIGS. 1 and 2, a sealant shown therein comprises a matrix 10 of a solvent free acrylic sealant material (typically that sold by Dow Corning under the Trade Name FRAME SEALANT).

Into the matrix material has been introduced a uniformly distributed frangible filler of small, hollow glass beads or spheres 12.

The glass spheres 12 typically have an outer diameter in the range of 20 to 200 microns and a wall thickness approximately 10% of their diameter.

The density of the glass spheres used lies in the range of 0.1 to 2.4 g/cc. The amount of glass spheres introduced to the matrix material preferably comprises two parts (by weight) for each 15 parts (by weight) of the matrix material.

It will be appreciated that when the sealant is compressed (typically to $1000KN/M^2$) between two surfaces some of the glass spheres fracture—more spheres fracturing between parts of the two surfaces which are closer together. In this way the sealant allows the matrix material to more readily conform to the shapes of the two surfaces between which it is sandwiched without undue disruption or distortion to the molecular structure of the polymeric matrix material—thereby maintaining the homogeneity of the seal.

Typically the glass spheres introduced to the matrix material would be soda lime borosilicate glass spheres approximately 75 microns in diameter and having a density of 0.12 g/cc.

FIG. 2 illustrates the sealant between two surfaces 14 and it will be appreciated that the glass spheres 12 in the sealant are more or less crushed as the two surfaces are brought together—there being more spheres crushed between the local "high points" of the two surfaces than between points on the surfaces which are further apart.

As well as the glass spheres particles of other materials having a relatively high thermal conductivity—e.g. of aluminium—may be incorporated in the matrix material so that the sealant will enhance transfer of heat between surfaces which it contacts.

Figure 3:
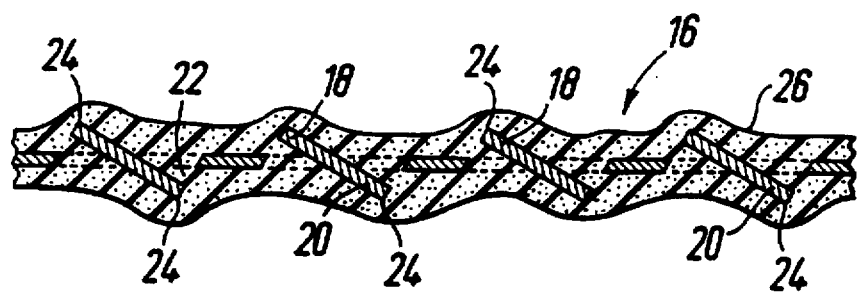
FIG. 3 is a sectional side view of a known form of conductive gasket coated with a sealant now proposed.
Figure 4:
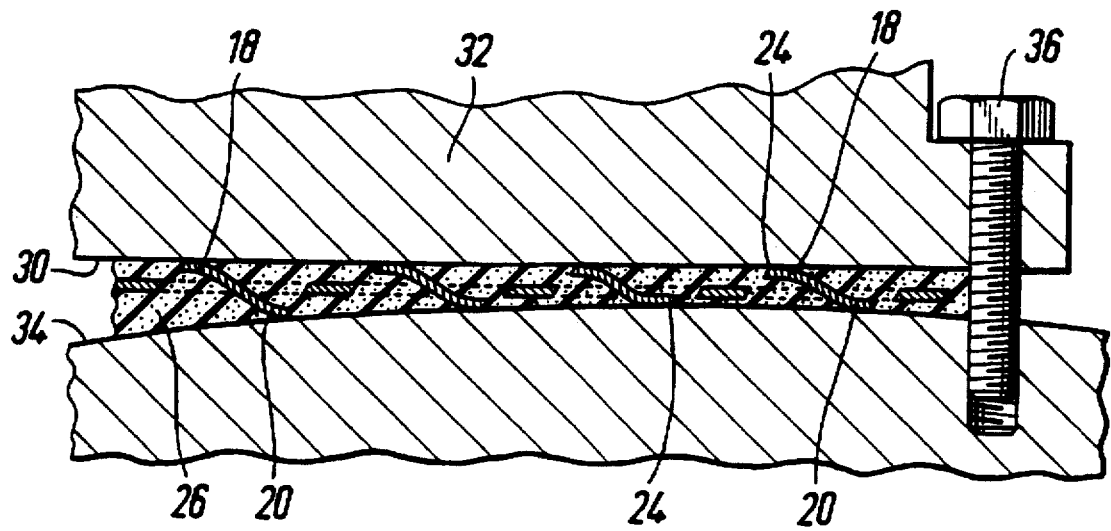
FIG. 4 shows the arrangement of FIG. 3 in use.

FIG. 3 shows a sectional view through a conductive sealing gasket 16 such as is described in UK Patent Specification 1 351 597, and FIG. 4 the mounting of the gasket between an antenna base and the skin of an aircraft.

The particular shape of any gasket in plane will depend upon the individual application to which it is to be put and the area and shape of the inter-engaging interfaces or surfaces which are to be sealed.

The gasket is made of pure aluminium or other material compatible with two metal surfaces to be bonded together—that is to say compatible as regards co-efficients of thermal expansion and/or corrosion.

The gasket is formed with a plurality or projecting portions 18 and 20 projecting respectively from its top and bottom surfaces (as viewed in FIG. 3). The projecting portions 18 and 20 are located at regularly spaced intervals across the surface of the gasket. The projecting portions 18 and 20 are closely spaced and preferably pitched at intervals which comprise a small fraction of the wave length of the highest expected frequency of operation of an antenna to be bonded to an aircraft making use of the gasket.

The projecting portions 18 and 20 are formed, as described in UK Patent Specification 1 351 597, simultaneously, by placing a gasket blank between two halves of a suitable tool.

In forming the projecting portions 18 and 20 holes 22 are formed in the gasket and, it will be seen, the projecting portions 18 to 20 terminate in peaks 24.

To the gasket described has been added a coating 26 of a sealant such as is described with reference to FIGS. 1 and 2 making the overall thickness of the gasket approximately 2 mm.

This coating is applied to the gasket as the gasket is formed and completely surrounds all the surfaces of the gasket and passes through the holes 22 therein. Each peak 24 of the projections 18 and 20 is covered by the sealant.

It will be seen that when the sealant coated gasket 16 is placed between two surfaces, for example as shown in FIG. 4 between the base 30 of an antenna 32 and the skin 34 of an aircraft, which are to be electrically coupled and pressure is applied—for example by tightening clamping screws 36 to hold the antenna 32 onto the skin 34 of the aircraft—the peaks 24 of the projections 18 and 20 cut through the matrix material of the sealant 26 such that the peaks 24 are brought into contact with the surfaces 30 and 34 to be electrically conductively coupled.

Further compression of the surfaces 30 and 34 one to the other will cause the projections 18 and 20 to collapse with the peaks 24 bearing tightly against the two surfaces. At the same time the glass spheres in the sealant will tend to collapse particularly in areas of local, high, pressure.

It will be appreciated that as the protrusions 18 and 20 meet the surfaces 30 and 34 of the antenna 32 and the aircraft, and the gasket 16 is crushed, the peaks 24 tend to wipe across the surfaces 30 and 34 clearing away any matrix material which might be located thereon and ensuring good electrical connection between the antenna base and the aircraft on which it is mounted.

Further it will be appreciated that the gasket 16, with its sealant coating 26, will be crushed locally to conform to the shapes of the two surfaces between which it is sandwiched.

It is envisaged that the gasket 16 will have an initial thickness (peak to peak plus the thickness of sealant thereon) of approximately 2 mm and that it may be crushed between the two surfaces to a thickness of approximately 0.1 mm.

With the ability of the gasket 16 to compress from an initial thickness of 2 mm to as little as 0.1 mm it will be appreciated the arrangement proposed enables very large irregularities between the surfaces of an antenna and an airframe to be accommodated. In particular the arrangement is suitable for use where the curvature of the airframe must be compensated for when mounting an antenna thereon.

It will further be seen that the large number of peaks 24 which contact the opposed surfaces of the antenna and airframe provide a relatively even distribution of contact points across the area of the gasket and as a result (bearing in mind the spacing of the peaks across the area of the gasket 16) a good RF bond will be obtained between the antenna and the aircraft so that the operation of the antenna is not adversely affected.

Figure 5:
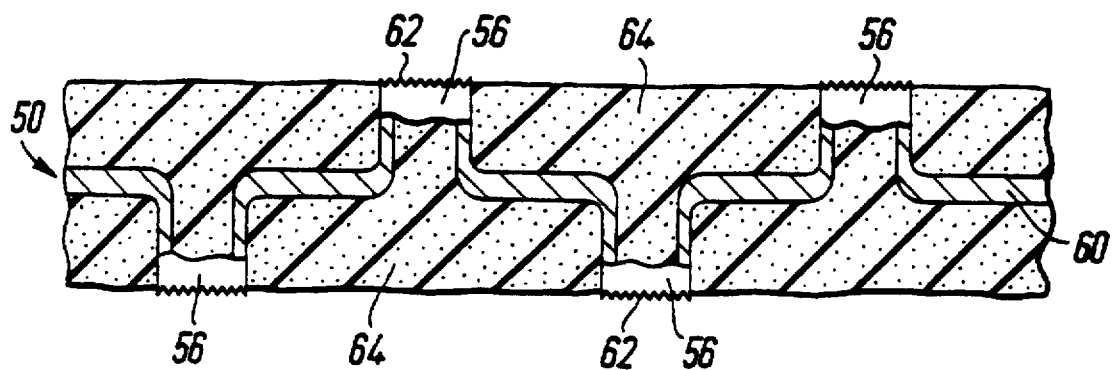
FIG. 5 and 6 are views similar to FIGS. 3 and 4, showing an alternative form of gasket.
Figure 6:
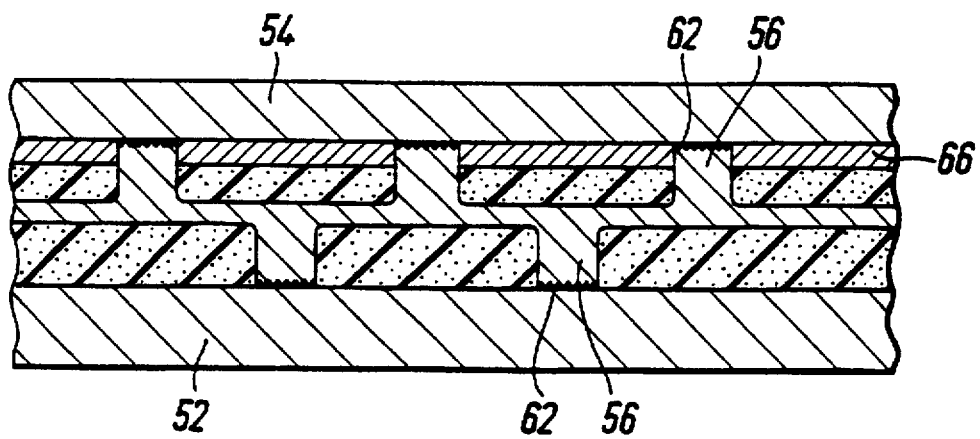

FIGS. 5 and 6 show another form of gasket sealing arrangement which embodies the present invention.

In this arrangement the gasket sealing arrangement is intended to be located between a carbon fibre airframe and an aluminium base plate for an antenna and the material of which the gasket is made, in these circumstances, is preferably nickel. As with the first described gasket sealing arrangement, however, the gasket may be formed of any material which is compatible with the materials between which it is to be located—that is, again, to say compatible as regards co-efficients of thermal expansion and/or corrosion.

As can be seen clearly from FIGS. 5 and 6 the gasket has a plurality of portions or members 56 which project generally normally of the top and bottom surfaces (as viewed in FIGS. 5 and 6) of the metal (nickel) plate 60 forming the major part of the gasket.

The projecting members 56 are regularly located and closely spaced across the surface of the gasket; and again, are preferably pitched at intervals which comprise a small fraction of the wave length of the highest expected frequency of operation of the antenna to be bonded to an aircraft making use of the sealing arrangement.

The projecting portions 56 are formed in the nickel plate 60 by placing the gasket blank between two halves of a suitable tool. Each half of the tool is provided with a plurality of circular-in-section needle like structures which upstand from the surface of the tool half and with a plurality of apertures or bores. The upstanding structures and bores of one tool half are in register with the bores and upstanding structures of the other tool half. After the gasket blank has been placed between the two halves they are brought together such that the needle like structures on one half enter into the bores of the other half after passing through the material of the gasket blank 60 and at the same time form the upstanding members 56.

In forming the upstanding members 56 the material of the gasket blank 60 is ruptured so that the projections 56 are hollow and their outermost ends 62 terminate in jagged, circular-in-plan, mouths.

Typically, the gasket blank will be 50 microns thick, the closest spacing of the projections 56 on each side of the gasket will be 5 mm, the height of the projections will be 0.4 mm, and, again typically, the diameter of the projection will be 0.6 mm.

To the gasket described has been added a coating of a sealant 64 which may be the same as that described with reference to FIGS. 1 and 2 but which, in accordance with this embodiment of the invention may alternatively be formed of a rubber material such as that sold under the Trade Name PR1301-2 as supplied by PRC Precision Rubber Company, to which has been added 10% by weight of glass micro spheres.

A typical way of obtaining this particular coating mixture of matrix material and glass spheres is to add to the rubber material (PR1301-2) a solvent such as methylethylketone mixed with the glass spheres. After thorough mixing and coating on the formed gasket, the mixture is cured with hydrogen peroxide to leave the rubber with embedded microspheres coating the gasket.

Typical ratios, by weight, of the rubber: solvent:microspheres are 10:7:1. and with such a mix one part by weight of hydrogen peroxide would be used for curing.

This coating, is applied to the gasket to the extent shown in FIG. 5—that is to say such that the matrix material with embedded glass microspheres covers the major surfaces of the gasket to a depth substantially equal to the height of the protrusions 56 formed thereon. The upper, jagged, edges 62 of the protrusions stand at or very slightly above the matrix material 64.

It will be appreciated that in forming the coating the matrix material will extend into the hollow protrusions 56 as shown.

Once coated with the solution of PR1301-2 dissolved in methylethylketone containing microspheres, hydrogen peroxide is used to cure the mix rubber such that it sets firmly on the gasket.

Once the sealant coated gasket has been formed in this way it may be placed between two surfaces such as are shown at 52 and 54 in FIG. 6—reference 52 denoting the aluminium base plate of an antenna and reference 54 the carbon fibre reinforced body of an airframe which is coated with a layer 66 of paint.

As the antenna base is forced into engagement with the gasket sealing arrangement the jagged edges 62 of the protrusions 56 facing the airframe will cut through the paint surface 66 until they contact the airframe itself. Similarly the jagged edges of the protrusions 56 extending away from the airframe will contact the base 52 of the antenna to be mounted on the airframe.

Further compression of the gasket (for example by means of a bolt such as is described with reference to FIG. 4) will cause the jagged edges 62 of the protrusions 56 to cut into the airframe and the antenna base ensuring there is a good electrical connection between the two.

As with the arrangement already described with reference to the earlier Figures it is possible for other particles having relatively high thermal and/or electrical conductivity to be incorporated in a rubber matrix material used to coat the gasket blank enabling the sealant to act to enhance the transfer of heat away from the surface—for example of an item of radio equipment mounted making use of a sealant or a gasket coated with the sealant.

As with the earlier described arrangement deformation of the gasket as it is compressed causes the glass spheres in the matrix material to break and in this way the sealant may more readily adapt, upon compression, to the shapes of the surfaces between which it is sandwiched than would otherwise be the case.

Under normal pressures the elastic limit of the matrix material will not be exceeded with the result that the material will remain homogeneous and continuous providing a proper seal for the joint.

It will be appreciated therefore that the present invention provides a sealant and a gasket coated with a sealant both of which are readily usable without particular expertise and both of which will upon pressure deform enabling them to adapt to the shapes of surfaces between they are interposed, thereby overcoming known problems with the presently used arrangements.

In particular known methods for providing a two-part, wet, sealant are as noted above perceived to be messy and their preparation to require a high level of skill. A thin (elastic or inelastic) sealant will not readily conform to the shapes of surfaces it lies between (if they are not the same)

thus making it difficult to provide an adequate seal. The use of a relatively thick elastic sealant increases difficulties in use—an antenna mounted on an aircraft making using of such a sealant will experience increased vibration in flight due to the nature of the sealant.

It will be appreciated that modifications may be made to the arrangements described above without departing from the scope of the present invention which provides a novel method, means and apparatus for sealing between two surfaces.

I claim:

1. A sealing gasket for placement between two surfaces to provide electrical interconnection therebetween, the gasket comprising:
   an electrically conductive metal sheet with front and rear surfaces and having protrusions extending generally normally away from each said surfaces, the protrusions being in the form of hollow members punched from the material of the sheet; and
   a sealant consisting of a matrix of flexible material, precoated on said sheet and having embedded therein a plurality of frangible elements which are inert to the matrix material, and wherein the sealant extends over said surfaces of said sheet and into each of said hollow members;
   wherein the arrangement providing that upon application of pressure to the gasket by surfaces between which the gasket is placed, the protrusions extend through the matrix material to contact and provide electrical contact between the surfaces between which the gasket is placed.

2. A sealing gasket as claimed in claim 1, wherein the upper edges of said hollow members forming the protrusions are coterminous with the surface of the matrix material on the metal sheet.

3. A sealing gasket as claimed in claim 2, wherein the material of the metal sheet is selected from the group consisting of aluminum, nickel and other metals on the basis of its compatibility with the materials of devices between which the gasket is to be interposed.

4. A sealing gasket as claimed in claim 1, wherein said flexible matrix material comprises any suitable elastomeric polymer or copolymer.

5. A sealing gasket as claimed in claim 3, wherein said flexible matrix material comprises any suitable elastomeric polymer or copolymer.

6. A sealing gasket as claimed in claim 5, wherein said matrix material is selected from the group consisting of acrylonitrile copolymers, polyvinyl alcohols, polyurethanes, silicones, acrylonitrile-butiedene-styrene terpolymer and rubber.

7. A sealing gasket as claimed in claim 1, wherein said frangible elements are hollow glass spheres.

8. A sealing gasket as claimed in claim 7, wherein said hollow glass spheres have a diameter of between 20 and 200 microns and a density in a range of 0.1 to 2.4 g/cc.

9. A sealing gasket as claimed in claim 8 wherein said glass spheres have a diameter substantially equal to 75 microns and a density substantially equal to 0.12 g/cc.

10. A sealing gasket as claimed in claim 4, wherein said sealant comprises 15 parts by weight of a solvent free acrylic matrix material admixed with two parts by weight of hollow glass spheres with a diameter substantially equal to 75 microns and a density substantially equal to 0.12 g/cc.

11. A sealing gasket as claimed in claim 9, wherein said sealant comprises 15 parts by weight of a solvent free acrylic matrix material admixed with two parts by weight of hollow glass spheres with a diameter substantially equal to 75 microns and a density substantially equal to 0.12 g/cc.

12. A sealing gasket as claimed in claim 4, wherein the sealant comprises 10 parts by weight of rubber and one part by weight of hollow glass spheres with a diameter substantially equal to 75 microns and a density substantially equal to 0.12 g/cc.

13. A sealing gasket as claimed in claim 9, wherein the sealant comprises 10 parts by weight of rubber and one part by weight of hollow glass spheres with a diameter substantially equal to 75 microns and a density substantially equal to 0.12 g/cc.

14. A sealing gasket as claimed in claim 1, wherein the sealant coating includes, in addition to the noted frangible elements, particles of other materials having a relatively high electrical conductivity.

15. A sealing gasket as claimed in claim 1, wherein said protrusions are driven to collapse as pressure is applied to them, and wherein the frangible elements in the matrix material are locally crushed as pressure is applied to the gasket.

* * * * *